May 15, 1962 A. COHEN 3,034,711

CARD READER

Filed Dec. 30, 1958 2 Sheets-Sheet 1

INVENTOR.
ALBERT COHEN

BY P. E. Henninger

ATTORNEY

May 15, 1962 A. COHEN 3,034,711

CARD READER

Filed Dec. 30, 1958 2 Sheets-Sheet 2

INVENTOR.
ALBERT COHEN

BY [signature]

ATTORNEY

3,034,711
CARD READER

Albert Cohen, Bayside, N.Y., assignor, by mesne assignments, to Shoup Electronics, Inc., Jamaica, N.Y., a corporation of New York Filed Dec. 30, 1958, Ser. No. 783,821
16 Claims. (Cl. 235—61.11)

This invention relates to a reading mechanism for electrically sensing code holes in perforated cards.

The mechanism was conceived as a component of a toll road accounting system with the particular purpose of reading account identification plates issued to persons who may be authorized to use such roads on a credit basis and who must, consequently, be properly identified and billed periodically for the road use enjoyed by them during a preceding billing period.

It is easy to understand that a system such as that above-described must entail special safeguards. The card reading mechanism employed in the indicated environment will usually be located in open atmosphere which is conducive to corrosion and impairment of electrical contacts; the charge cards ordinarily will be carried by drivers of trucks and other commercial vehicles, as well as by maintenance personnel and other non-revenue users, with the result that they may suffer damage which may partially clog or otherwise impair the perforations therein; the reading mechanism must be so constructed that an expired or cancelled charge card will not be read when presented; and finally, due to changing and sometimes inexperienced personnel, the reading mechanism must be so constructed that a card reading operation will not be initiated unless a valid card is properly positioned in respect to the reading elements and once so positioned, the card must be locked in the reading mechanism until the reading operation is completed.

It is, therefore, the object of this invention to provide a perforated card reader which provides the safeguards and features above indicated.

The objectives of the invention are served by a card reading mechanism having a plurality of reading pins mounted for limited movement in a fixed axial path, and a card supporting plate mounted in spaced relationship to the ends of the reading pins so as to form a card reading gap between the card supporting plate and the ends of the reading pins. The card supporting plate is mounted for translation in a curvilinear path whereby it is moved into contact with the ends of the reading pins and also in a direction transverse to the axes of the reading pins after contact between the ends of the pins and the plate has been established. This motion of the card plate in respect to the reading pins insures the penetration of pins into any corresponding card holes even though such holes are partially clogged or otherwise obstructed. Furthermore, there results a limited sliding movement between the ends of the reading pins and the card supporting plate such that a good electrical contact is established despite the presence of foreign matter between the ends of the pins and the surface of the card supporting plate.

Another feature of the invention resides in the provision of card responsive card identification means located in the path of a card inserted into the card reading gap between the card supporting plate and the ends of the reading pins. Thus, a card may be provided with a surface which is common to all valid cards for operating the card responsive identification means such that only in case the card identification means is operated by a valid card will a card reading operation be initiated.

A further feature of the invention resides in mechanism embodied therein for relating a card to a particular toll system and for securing a card against removal from the card reading mechanism until a reading operation has been completed. This feature involves a pin adapted to engage in a special hole in the card whereby the card is held against the removal, the pin having operating mechanism associated with it which will project the pin into the card hole only when a valid card is properly positioned in the card reading gap formed between the card supporting plate and the ends of the reading pins.

These and other objectives, features and advantages of the invention will be pointed out in the following specification and others will become apparent from a reading thereof in conjunction with the drawings forming a part of the application. In the drawings, like reference numerals indicate like parts, and:

Figures 2, 4:
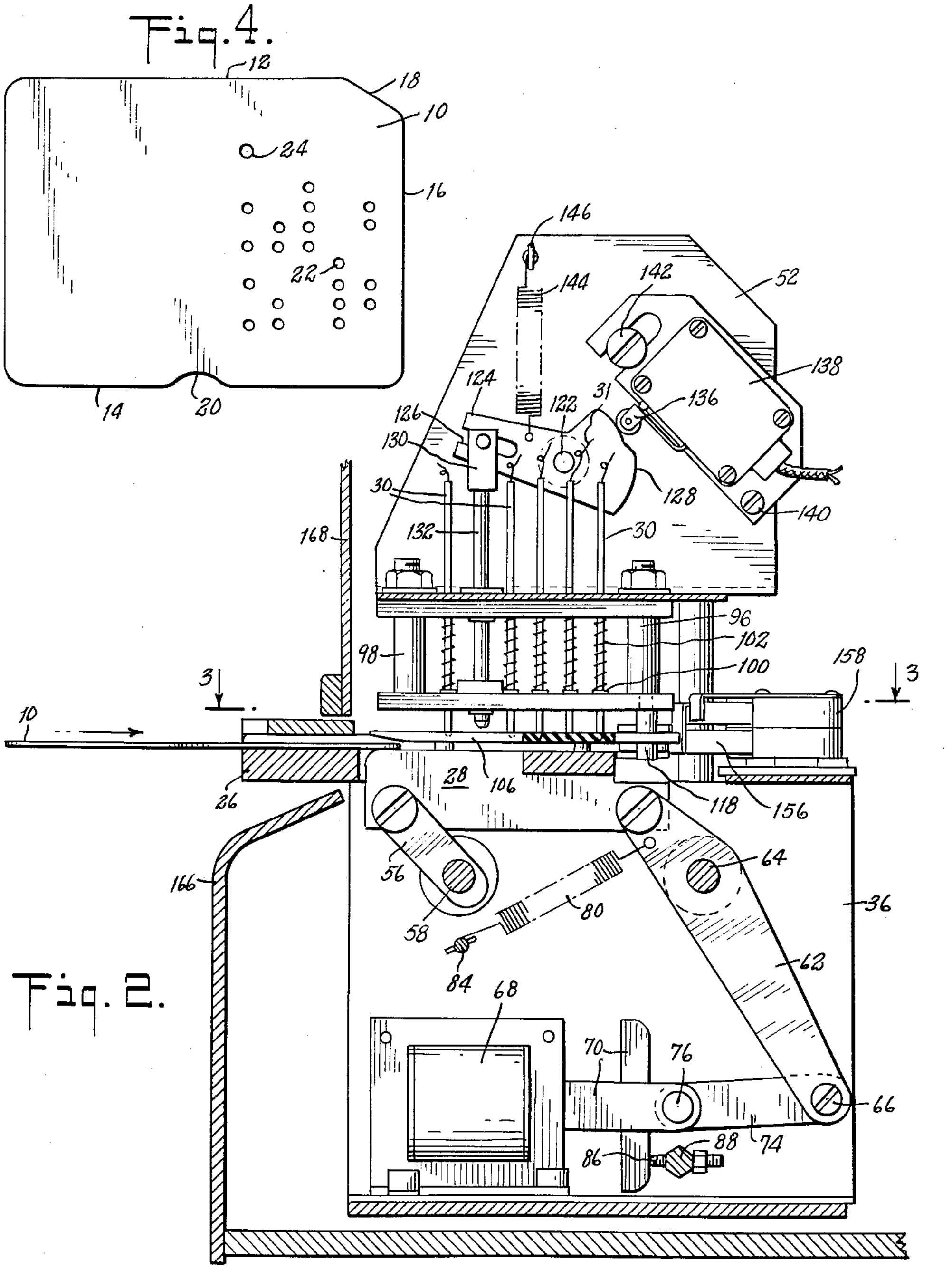
FIG. 2 is a view on line 2—2 of FIG. 1.
FIG. 4 illustrates a perforated card or charge plate adapted to be received in and read by the card reader herein.

The card 10 of FIG. 4 on which the reader herein is adapted to operate is characterized by a plurality of physical features which cooperate with elements of the card reader and which are adapted to influence the response of the reader. The card 10 has a pair of parallel edges 12 and 14 which define the width of the card and which control the lateral position of the card within the reader by cooperating with a card reading throat at the entrance of the reader. The forward edge 16 of the card is adapted to contact a pair of stop pins in the reader to control the longitudinal position of the card. The forward edge 16 of the card is also adapted to operate a microswitch when the card is in proper position and the edge 14 of the card together with a notch 20 in said edge cooperate with and control a microswitch within the reader. The data, such as an account number, is represented in the card by a plurality of punched holes 22, and a locking hole 24 is provided for cooperation with a card locking pin which holds the card in reading position within the reader until a reading operation is performed.

As shown in FIG. 2, the card 10 is being inserted into the card reading mechanism by way of a card reading throat 26. Directly beyond the inner end of the card reading throat 26 is a reading plate 28 which is electrically connected in the card reading circuit and which is adapted to receive the card and present the same to a plurality of reading pins 30. The reading pins 30 are spring biased toward the reading plate 28 and the reading plate is mounted for curvilinear translation such that when it is operated, it will move not only towards the reading pins but also in a direction transverse of their axes. Thus, when a card is being read, the reading pins 30 corresponding to the holes 22 of the card will enter such holes, will contact the reading plate 28 and the reading plate will slide in contact with the ends of the reading pins as a result of the horizontal reciprocating component of its movement, thereby establishing a good electrical contact between the reading plate 28 and the ends of the reading pins 30. Reading pins, which find no corresponding card holes, will be moved upwardly by the face of the card 10 against their spring bias. Pins which find a card hole and, therefore, come into contact with the reading plate 28, will establish an electrical circuit through their connections 31 such that data representing pulses thereon may be interpreted in known manner. Pins which do not find holes in the card will rest on the face of the card, and since the card is formed of a suitable dielectric, such pins will not complete a circuit.

The operative parts of the card reader are mounted on a suitable framework supported by a base plate 32. By reference to FIG. 1, it can be seen that the base plate 32 has attached thereto an upstanding right side wall 34 and a similar upstanding left side wall 36. The upper ends of the side walls 34 and 36 are outwardly flanged to support a superstructure in which the reading pins 30 and associated mechanism are mounted. Thus, the upper end of the right side wall 34 terminates in a relatively wide outturned flange 38 and the upper end of the left side wall 36 terminates in a relatively narrow outturned flange 40. A head plate 42 is supported from the flanges 38 and 40 by means of pairs of spacing bolts 44—46 and 48—50, respectively. Attached to one edge of the head plate 42 is a head bracket 52. The spacing bolts 44 and 48 are also utilized to fix the card throat 26 to the side walls 34 and 36.

The reading plate 28 and a quadric chain mechanism for mounting and operating the same are located between the side walls 34 and 36, while the reading pins 30 and their associated mechanism are mounted in the superstructure comprising the head plate 42 and the head bracket 52.

The forward end of the reading plate 28 is pivoted on the end of a pair of links 54 and 56, the opposite ends of the links 54 and 56 are fulcrumed on a transverse pivot shaft 58 which is fixed in and extends between the side walls 34 and 36 of the frame member. The rear end of the reading plate 28 is pivoted on the short arm of a pair of bell cranks 60 and 62. The bell cranks 60 and 62 are mounted on a rear pivot shaft 64, the rear pivot shaft 64 extending between the side walls 34 and 36 and being fixed therein. The length and angular disposition of the links 54 and 56 and that of the short end of the bell cranks 60 and 62 are the same such that when the bell cranks 60 and 62 are rocked about the rear pivot shaft 64, the reading plate 28 will be both elevated and moved rearwardly in a path of curvilinear translation.

The long arms of the bell cranks 60 and 62 extend downwardly and rearwardly from the rear pivot shaft 64 where they are connected by means of a transverse connecting rod 66.

Mounted on the base plate 32 is an actuating solenoid 68 which has an armature 70. The outer end of the armature is pivoted to a link 74 by means of a pin 76 and the opposite end of the link 74 is pivoted on the connecting rod 66. It can be seen, therefore, that whenever the solenoid 68 is energized, it will attract its armature 70 such that the link 74 will be drawn to the left, as viewed in FIG. 2. This will result in the clockwise movement of the bell cranks 60 and 62 about the rear pivot shaft 64 with the resultant operation of the reading plate 28 into card reading position.

The reading plate 28 is returned to its normal inoperative position by means of a pair of springs 78 and 80 which are connected respectively to the short ends of the bell cranks 60 and 62, the opposite ends of the springs being anchored respectively in anchor studs 82 and 84 extending inwardly from the adjacent side walls of the frame. Outward movement of the armature 70 can be adjustably regulated by means of a stop screw 86 mounted in a transverse stop shaft 88 in such position as to make contact with the armature 70 at the desired position.

The reading pins are mounted in a reading pin guide assembly which consists of an upper pin guide plate 92 and a lower pin guide plate 94, the plates 92 and 94 being held in spaced relation by a pair of spacing bolts 96 and 98 at the front of the assembly and a similar pair of spacing bolts at the rear of the assembly. Both pin guide plates 92 and 94 are formed of a rigid dielectric material. The pin guide plates have aligned holes formed therein to accommodate the reading pins 30 and to guide such pins for axial movement during a card reading operation. Each of the reading pins 30 is formed near its lower end with a groove into which is snapped a split spring washer 100 which constitutes the support for the lower end of a spring 102 which is coiled about the pin. The upper ends of the reading pin springs 102 abut the lower face of the upper pin guide plate 92. This results in a constant gentle spring bias of the reading pins, such that any pins which enter corresponding holes in the card 10 will be spring pressed against the reading plate 28 while those that find no card hole will yield in an upward direction.

The reading pin guide assembly 90 is fixed to the under face of the head plate 42 by means of its spacing bolts 96, etc.

Figures 1, 3:
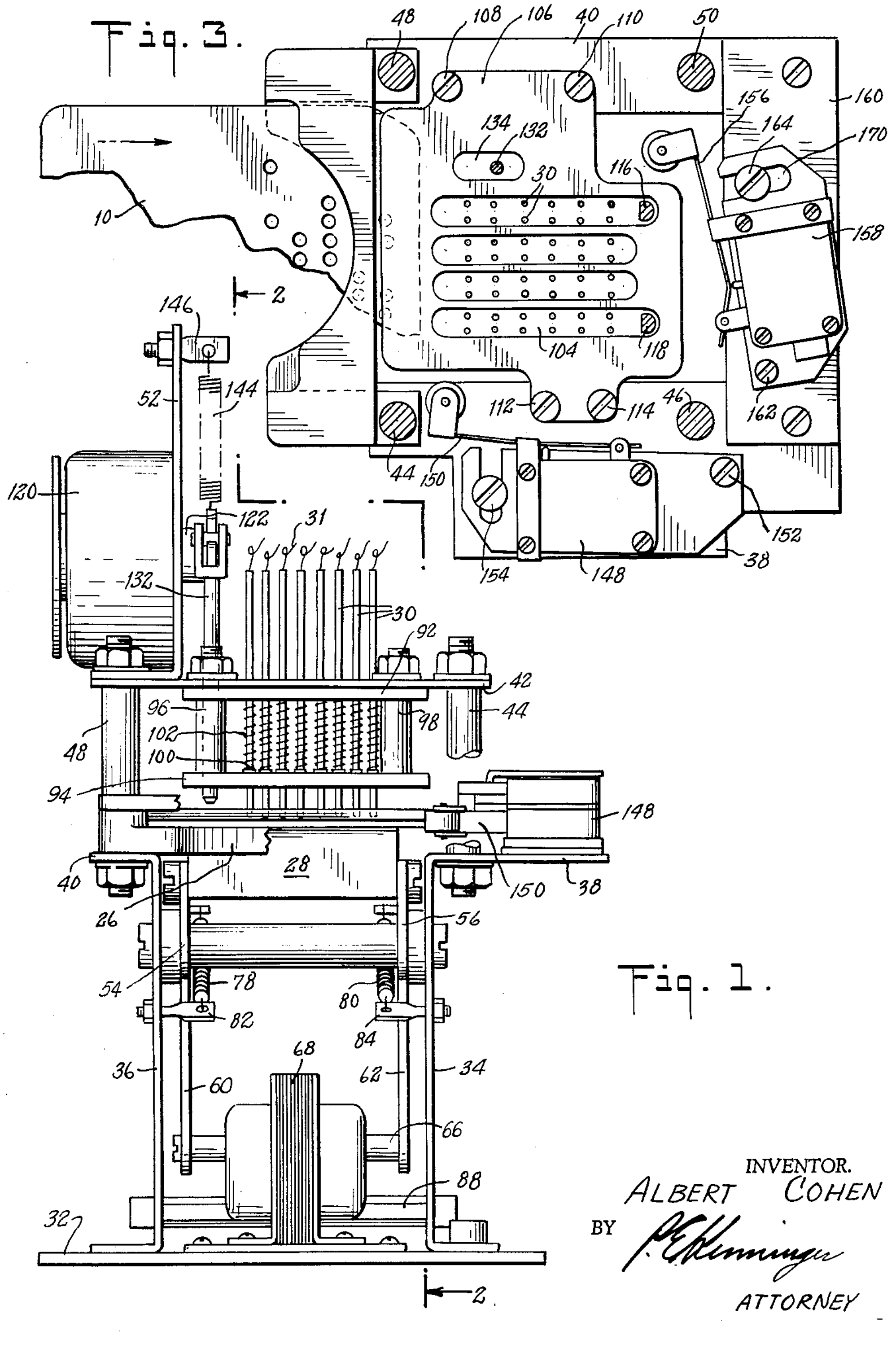
FIG. 1 is a front elevational view of one embodiment of the card reader comprising the invention herein, parts being broken away to show underlying structure.
FIG. 3 is a view on line 3—3 of FIG. 2.

The lower ends of the reading pins extend into slots 104 of a card plate 106, as best shown in FIG. 3. The card plate 106 is formed of a sheet of rigid dielectric material and is fixed to move in spaced relation in respect to the reading plate 28 by means of screws 108, 110, 112 and 114 which are screwed into lateral extensions of the reading plate structure. A pair of stop pins 116 and 118 having forwardly turned flat faces are mounted in the lower pin guide plate 94 and extend downwardly therethrough into a pair of spaced slots 104 in the card plate 106. The stop pins 116 and 118 are so positioned that they limit the insertion of a card 10 into the reading mechanism.

Mounted on the head bracket 52 is a rotary solenoid 120 whose rotary shaft 122 extends through a passage in the head plate 52. The inner end of the solenoid shaft 122 has fixed thereto a card locking pin actuator and cam 124. The card locking pin actuator and cam 124 is a generally elongated structure having a slot 126 in one end thereof and a cam surface 128 at the other end thereof. Cooperating with the slot 124 is a connecting clevis structure 130 formed at the top of a card locking pin 132. The card locking pin extends downwardly through the head plate 42, through the upper pin guide plate 92, the lower pin guide plate 94 and registers with an offset slot 134 in the card plate 106.

The perforation 24 of the card 10 is so located in the card that it will be under the card plate slot 134 and will register with the card locking pin 132. When a card is inserted into the card reader and the rotary solenoid 120 is energized to rotate the shaft 122 of the solenoid in a counter-clockwise direction, the card locking pin actuator and cam 124 will project the card locking pin 132 into the hole 24 of the card, thus holding the card in position until the reading operation thereon is performed.

The cam surface 128 of the card locking pin actuator and cam 124 is in contact with an operating blade 136 of a normally open microswitch 138 which is mounted on the head bracket 52 by means of a pair of screws 140 and 142. It is evident, therefore, that as the rotary solenoid 120 is energized and the card locking pin 132 is projected, a high part of the cam 128 will operate the blade 136 of the microswitch 138 and thereby close the switch. When the rotary solenoid 120 is deenergized, the card locking pin actuator and cam 124 and the card locking pin 132 are elevated by means of a spring 144 whose one end is attached to the card locking pin actuator and cam 124 and whose other end is attached to a spring anchor 146 mounted at the top of the head bracket 52.

As previously stated, the edge 16 of the card and its edge 14, including the notch 20 therein, are also adapted to perform control function within the reader. Mounted on the flange 38 at the right side wall of the frame is a normally closed microswitch 148. The switch 148 has an inwardly projecting operating blade 150 which extends into the path of the card edge 14. Therefore, when a card 10 is inserted through the reading card throat, the edge 14 of the card will move the switch blade 150 outwardly, thereby opening the switch. However, when the card is further inserted to bring the notch 20 into alignment with the operating blade 150, the blade will move inwardly far enough to close the switch. The switch 148 is mounted on the flange 38 by means of a pair of screws 152 and 154. When the card 10 is properly positioned under the card reading pins 30 with its forward edge 16 in contact with the stop pins 116 and 118, its forward edge 16 will contact the operating blade 156 of a normally open third microswitch 158; this microswitch being mounted on a flange 160 of the frame structure by means of a pair of screws 162 and 164.

The microswitches 138, 148 and 158 are adjustable so that the position of their operating blades can be regulated. By reference to FIG. 3, for example, it can be seen that the screw 164 engages an elongated slot 170 in the base of the switch 158. By relieving the screw 164, the switch can be rotated about the screw 162 until the desired position of the switch blade 156 is attained. The adjusted position can be maintained then by tightening the screw 164.

The switch 148 is so mounted that it can be moved along its mounting flange 38 and secured in successive positions at ⅛ inch increments. Thus, the location of the notch 20 in the edge 14 of the card can be periodically changed and the location of the switch 148 can be correspondingly changed to correspond to the new position of the notch. It is apparent, therefore, that a card which does not contain the properly positioned notch will not be read in the reader. By this device cards issued prior to certain renewal dates will be rendered useless automatically.

The switch 148, as stated, is a normally closed switch and it is interlocked in the circuit of the switch 158, such that the latter switch, even though operated, will not complete a circuit unless the switch 148 is closed. It can be seen, therefore, that when a card is presented to the reader, an edge thereof such as the edge 14 of the card in FIG. 4, will open the switch 148 and thereby disable the circuit of the switch 158 unless the card has a properly located notch 20 which will permit the switch 148 to reclose.

It can be seen from what has been said above that features of the card reader may be employed to serve two functions. Thus, the switch 148 not only serves the function of recognizing whether a card is valid in point of time, but it also serves the purpose of ascertaining that the card is inserted into the reader with its proper face presented to the reading pins. Obviously, if the card is inverted such that its edge 12 is at the right as viewed in FIG. 1, the edge 12, containing no notch therein, will maintain the switch 148 in its open position so long as the inverted card is within the card reading gap. As pointed out above, this will disable the switch 158 and prevent further operation of the mechanism.

It has been stated that the card hole 24 is adapted to receive the card locking pin 132 to hold the card within the reader until a card reading operation has been completed. It should be pointed out that the card locking pin 132 may be placed in a unique location with the card hole 24 correspondingly placed such that it will identify a particular toll road system. This avoids the possibility of reading a similar charge card, but one which has not been issued for the toll road system in which the particular reader is installed and, therefore, has its hole 24 differently located.

For the purpose of illustrating the underlying structure of the card reader, its encasing housing, has for the most part been removed. However, the mechanism of the reader will be suitably encased by a housing of which partial elements 166 and 168 are shown in FIG. 2.

While the fundamentally novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

What is claimed is:

1. In a device for sensing holes in a perforated card, a plurality of reading pins mounted for limited movement in a fixed axial path, a card supporting plate mounted in spaced relationship to the ends of said reading pins thereby forming a card reading gap between said card supporting plate and the ends of said reading pins, means for guiding a perforated card into card reading position into said card reading gap between the ends of said reading pins and said card supporting plate, and means for translating said supporting plate in a curvilinear path whereby the same is moved into contact with the ends of said reading pins and also moved in a direction transverse to the axes of said pins both before and after contact between said pins and said plate has been established, there being no movement of said perforated card with respect to said supporting plate while said card is in said card reading position.

2. In a device for sensing holes in a perforated card, a plurality of reading pins mounted for limited movement in a fixed axial path, a card supporting plate mounted in spaced relationship to the ends of said reading pins thereby forming a card reading gap between said card supporting plate and the ends of said reading pins, means individual to each of said reading pins for urging the same toward said card reading gap under yielding pressure, means for guiding a perforated card into card reading position into said card reading gap between the ends of said reading pins and said card supporting plate, and means for translating said supporting plate in a curvilinear path whereby the same is moved into contact with the ends of said reading pins and also moved in a direction transverse to the axes of said pins both before and after contact between said pins and said plate has been established, there being no movement of said perforated card with respect to said supporting plate while said card is in said card reading position.

3. In a device for sensing holes in a perforated card, a plurality of reading pins mounted for limited movement in a fixed axial path, a card supporting plate mounted in spaced relationship to the ends of said reading pins thereby forming a card reading gap between said card supporting plate and the ends of said reading pins, spring means individual to each of said reading pins for urging the same toward said card reading gap under yielding pressure, means for guiding a perforated card into card reading position into said card reading gap between the ends of said reading pins and said card supporting plate, and means for translating said supporting plate in a curvilinear path whereby the same is moved into contact with the ends of said reading pins and also moved in a direction transverse to the axes of said pins both before and after contact between said pins and said plate has been established, there being no movement of said perforated card with respect to said supporting plate while said card is in said card reading position.

4. In a device for sensing holes in a perforated card, a plurality of reading pins mounted for limited movement in a fixed axial path, a card supporting plate articulated in spaced relationship to the ends of said reading pins thereby forming a card reading gap between said card supporting plate and the ends of said reading pins, means individual to each of said reading pins for urging the same toward said card reading gap under yielding pressure, means for guiding a perforated card into card reading position into said card reading gap between the ends of said reading pins and said card supporting plate, and electromagnetic means for translating said supporting plate in a curvilinear path whereby the same is moved into contact with the ends of said reading pins and also moved in a direction transverse to the axes of said pins both before and after contact between said pins and said plate has been established, there being no movement of said perforated card with respect to said supporting plate while said card is in said card reading position.

5. In a device for sensing holes in a perforated card, a plurality of reading pins mounted for limited movement in a fixed axial path, a card supporting plate mounted in spaced relationship to the ends of said reading pins thereby forming a card reading gap between said card supporting plate and the ends of said reading pins, means individual to each of said reading pins for urging the same toward said card reading gap under yielding pressure, means for guiding a perforated card into card reading position into said card reading gap between the ends of said reading pins and said card supporting plate, electromagnetic means for translating said supporting plate in a curvilinear path whereby the same is moved into contact with the ends of said reading pins and also moved in a direction transverse to the axes of said pins both before and after contact between said pins and said plate has been established, and means responsive to a card in reading position within said card reading gap for energizing said electromagnetic means.

6. In a device for sensing holes in a perforated card, a pair of spaced guide plates having a plurality of aligned holes therein, a reading pin mounted in each of said aligned holes for limited movement in a fixed axial path, a card supporting plate mounted in spaced relationship to the ends of said reading pins thereby forming a card reading gap between said card supporting plate and the ends of said reading pins, spring means individual to each of said reading pins located between said guide plates for urging said pins toward said card reading gap under yielding pressure, means for guiding a perforated card into card reading position into said card reading gap between the ends of said reading pins and said card supporting plate, electromagnetic means for translating said supporting plate in a curvilinear path whereby the same is moved into contact with the ends of said reading pins and also moved in a direction transverse to the axes of said pins both before and after contact between said pins and said plate has been established, and means responsive to a card in reading position within said gap for energizing said electromagnetic means.

7. In a device for sensing holes in a perforated card, a plurality of reading pins mounted for limited movement in an axial direction, a card supporting plate mounted in spaced relationship to the ends of said reading pins thereby forming a card reading gap between said card supporting plate and the ends of said reading pins, a card throat for inserting a perforated card into reading position within said card reading gap, a locking pin adapted to enter a card hole, a rotary shaft, lost motion means engaging said locking pin and said shaft, means responsive to a perforated card in reading position within said card reading gap for rotating said shaft and projecting said locking pin for securing a card in reading position throughout a card reading operation, and means for moving said card supporting plate into contact with the ends of said reading pins.

8. In a device for sensing holes in a perforated card, a plurality of reading pins mounted for limited movement in an axial direction, a card supporting plate mounted in spaced relationship to the ends of said reading pins thereby forming a card reading gap between said card supporting plate and the ends of said reading pins, a card throat for inserting a perforated card into reading position within said card reading gap, a locking pin adapted to enter a card hole, electromagnetic means responsive to a perforated card in reading position within said card reading gap for projecting said locking pin for securing a card in reading position throughout a card reading operation, and means for moving said card supporting plate into contact with the ends of said reading pins.

9. In a device for sensing holes in a perforated card, a plurality of reading pins mounted for limited movement in an axial direction, a card supporting plate mounted in spaced relationship to the ends of said reading pins thereby forming a card reading gap between said card supporting plate and the ends of said reading pins, a card throat for inserting a perforated card into reading position within said card reading gap, a locking pin adapted to enter a card hole, a rotary solenoid responsive to a perforated card in reading position within said card reading gap for projecting said locking pin for securing a card in reading position throughout a card reading operation, and means for moving said card supporting plate into contact with the ends of said reading pins.

10. In a device for sensing holes in a perforated card, a plurality of reading pins mounted for limited movement in an axial direction, a card supporting plate mounted in spaced relationship to the ends of said reading pins thereby forming a card reading gap between said card supporting plate and the ends of said reading pins, a card throat for inserting a perforated card into reading position within said card reading gap, a locking pin adapted to enter a card hole, electromagnetic means responsive to a perforated card in reading position within said card reading gap for projecting said locking pin for securing a card in reading position throughout a card reading operation, means for moving said card supporting plate into contact with the ends of said reading pins, means responsive to the reading of a card for deenergizing said electromagnetic means, and a spring thereafter operative to restore said locking pin.

11. In a device for sensing holes in a perforated card, a plurality of reading pins mounted for limited movement in an axial direction, a card supporting plate mounted in spaced relationship to the ends of said reading pins thereby forming a card reading gap between said card supporting plate and the ends of said reading pins, a card passage for inserting a perforated card into said card reading gap, card identification means located in the path of a card inserted into said card passage, said card identification means being responsive solely to a uniquely positioned variation in the contour of an edge of said perforated card, and means responsive to the operation of said last named means for moving said card supporting plate into contact with any of said reading pins extending through holes in a card within said card reading gap.

12. In a device for sensing holes in a perforated card, a plurality of reading pins mounted for limited movement in an axial direction, a card supporting plate mounted in spaced relationship to the ends of said reading pins thereby forming a card reading gap between said card supporting plate and the ends of said reading pins, a card passage for inserting a perforated card into said card reading gap, a card identification switch located in the path of a card inserted into said card passage, said card identification switch being responsive solely to a uniquely positioned variation in the contour of an edge of said perforated card, and means responsive to the operation of said switch for moving said card supporting plate into contact with any of said reading pins extending through holes in a card within said card reading gap.

13. In a device for sensing holes in a perforated card, a plurality of reading pins mounted for limited movement in an axial direction, a card supporting plate mounted in spaced relationship to the ends of said reading pins thereby forming a card reading gap between said card supporting plate and the ends of said reading pins, a card passage for inserting a perforated card into said card reading gap, a card identification switch located in the path of a card inserted into said card passage, said card identification switch being responsive solely to a uniquely positioned variation in the contour of an edge of said perforated card, and electromagnetic means responsive to the operation of said switch for moving said card supporting plate into contact with any of said reading pins extending through holes in a card within said card reading gap.

14. In a device for sensing holes in a perforated card, a plurality of reading pins mounted for limited movement in an axial direction, a card supporting plate mounted in spaced relationship to the ends of said reading pins thereby forming a card reading gap between said card supporting plate and the ends of said reading pins, a card passage for inserting a perforated card into said card reading gap, card identification means located in the path of a card inserted into said card passage, said identification means being responsive solely to a uniquely positioned variation in the contour of an edge of said perforated card, and means responsive to the operation of said last named means for moving said card supporting plate and any of said reading pins extending through holes in a card within said card reading gap into contact with each other to perform a card reading operation.

15. In a device for sensing holes in a perforated card, a plurality of reading pins mounted for limited movement in an axial direction, a card supporting plate mounted in spaced relationship to the ends of said reading pins thereby forming a card reading gap between said card supporting plate and the ends of said reading pins, a card passage for inserting a perforated card into said card reading gap, a card identification switch located in the path of a card inserted into said card passage, said identification switch being responsive solely to a uniquely positioned variation in the contour of an edge of said perforated card, and means responsive to the operation of said switch for moving said card supporting plate and any of said reading pins extending through holes in a card within said card reading gap into contact with each other to perform a card reading operation.

16. In a device for sensing holes in a perforated card, a plurality of reading pins mounted for limited movement in an axial direction, a card supporting plate mounted in spaced relationship to the ends of said reading pins thereby forming a card reading gap between said card supporting plate and the ends of said reading pins, a card passage for inserting a perforated card into said card reading gap, a card identification switch located in the path of a card inserted into said card passage, said identification switch being responsive solely to a uniquely positioned variation in the contour of an edge of said perforated card, and electromagnetic means responsive to the operation of said switch for moving said card supporting plate and any of said reading pins extending through holes in a card within said card reading gap into contact with each other to perform a card reading operation.

References Cited in the file of this patent

UNITED STATES PATENTS

| | | |
|---|---|---|
| 2,395,557 | Leathers | Feb. 26, 1946 |
| 2,798,668 | Watkin | July 9, 1957 |
| 2,890,828 | Stark et al. | June 16, 1959 |